(12) United States Patent
Yamaki et al.

(10) Patent No.: US 11,112,670 B2
(45) Date of Patent: Sep. 7, 2021

(54) LIGHT CONTROL FILM, LIGHT CONTROL SYSTEM, AND LIGHT CONTROL MEMBER

(71) Applicant: DAI NIPPON PRINTING CO., LTD., Tokyo (JP)

(72) Inventors: Makoto Yamaki, Tokyo (JP); Tomoya Kawashima, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/488,807

(22) PCT Filed: Mar. 12, 2018

(86) PCT No.: PCT/JP2018/009489
§ 371 (c)(1),
(2) Date: Aug. 26, 2019

(87) PCT Pub. No.: WO2018/164282
PCT Pub. Date: Sep. 13, 2018

(65) Prior Publication Data
US 2020/0271964 A1 Aug. 27, 2020

(30) Foreign Application Priority Data
Mar. 10, 2017 (JP) .............................. JP2017-046718

(51) Int. Cl.
*G02F 1/137* (2006.01)
*G02F 1/1333* (2006.01)

(52) U.S. Cl.
CPC ........ *G02F 1/137* (2013.01); *G02F 1/133302* (2021.01); *G02F 2202/043* (2013.01)

(58) Field of Classification Search
CPC ... G02F 2001/133302; G02F 2202/043; G02F 1/137
See application file for complete search history.

(56) References Cited

U.S. PATENT DOCUMENTS 4,684,220 A * 8/1987 Shionozaki .......... C07D 213/57
546/287
5,264,953 A * 11/1993 Hirai ...................... G09G 3/002
348/761

(Continued)

FOREIGN PATENT DOCUMENTS

JP   H03-047392 A   2/1991
JP   H08-184273 A   7/1996

(Continued)

OTHER PUBLICATIONS

Schadt, Martin et al. "Surface-Induced Parallel Alignment of Liquid Crystals by Lineally Polymerized Photopolymers." Jpn. J. Appl. Phys., vol. 31, pp. 2155-2164, 1992.

(Continued)

*Primary Examiner* — Hoan C Nguyen
(74) *Attorney, Agent, or Firm* — Oliff PLC

(57) ABSTRACT

A light control film and a light control system, which not only simply change the amount of transmitted light but also can be used for a wider range of applications. This light control film includes a first electrode, a second electrode, a liquid crystal material, and a dichroic dye, and has a guest-host type liquid crystal layer in which light transmittance varies with the potential difference between the first electrode and the second electrode, wherein the liquid crystal layer has a first haze value when the potential difference is a first potential difference, has a second haze value when the potential difference is a second potential difference, and has a third haze value higher than at least the second haze value when the potential difference is a third potential difference between the first potential difference and the second potential difference.

14 Claims, 8 Drawing Sheets

(56) References Cited

U.S. PATENT DOCUMENTS

| | | | | |
|---|---|---|---|---|
| 5,285,299 A * | 2/1994 | Drzaic | | G02F 1/1334 |
| | | | | 349/177 |
| 5,710,609 A * | 1/1998 | Shimada | | G02F 1/1393 |
| | | | | 349/126 |
| 2010/0073605 A1* | 3/2010 | Masutani | | C09K 19/544 |
| | | | | 349/86 |
| 2014/0226096 A1* | 8/2014 | Taheri | | G02F 1/13306 |
| | | | | 349/33 |
| 2014/0285752 A1* | 9/2014 | Min | | C09K 19/60 |
| | | | | 349/88 |
| 2015/0323825 A1* | 11/2015 | Taheri | | E06B 9/264 |
| | | | | 349/1 |
| 2016/0160557 A1* | 6/2016 | Kim | | G02F 1/137 |
| | | | | 349/16 |
| 2016/0291357 A1* | 10/2016 | Min | | G02F 1/13439 |
| 2018/0011352 A1* | 1/2018 | Kim | | G02F 1/1334 |
| 2018/0051212 A1 | 2/2018 | De Bougrenet De La Tocnaye et al. | | |
| 2018/0373068 A1* | 12/2018 | Lim | | G02F 1/137 |
| 2018/0373084 A1* | 12/2018 | Lim | | G02F 1/1337 |
| 2019/0225886 A1* | 7/2019 | Ogita | | C09K 19/3066 |
| 2020/0209664 A1* | 7/2020 | De Jong | | G02F 1/13306 |

FOREIGN PATENT DOCUMENTS

| | | |
|---|---|---|
| JP | 2016-507784 A | 3/2016 |
| WO | 2014/126974 A1 | 8/2014 |
| WO | 2016/139150 A1 | 9/2016 |
| WO | 2016/159671 A1 | 10/2016 |

OTHER PUBLICATIONS

Schadt, Martin et al. "Optical patterning of multi-domain liquid-crystal displays with wide viewing angles." Letters to Nature, vol. 381, pp. 212-215, 1996.

May 22, 2018 International Search Report issued in International Patent Application No. PCT/JP2018/009489.

* cited by examiner

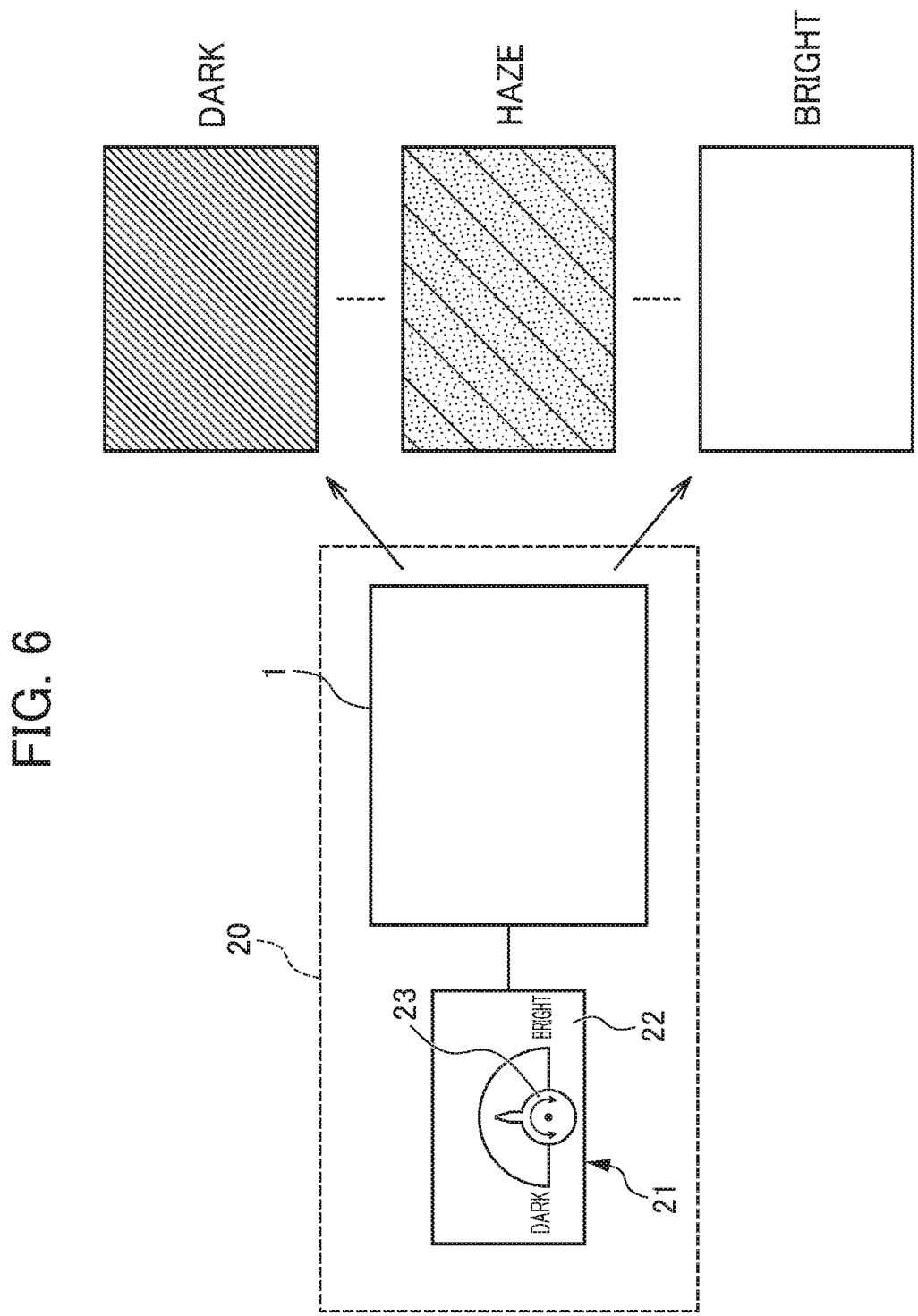

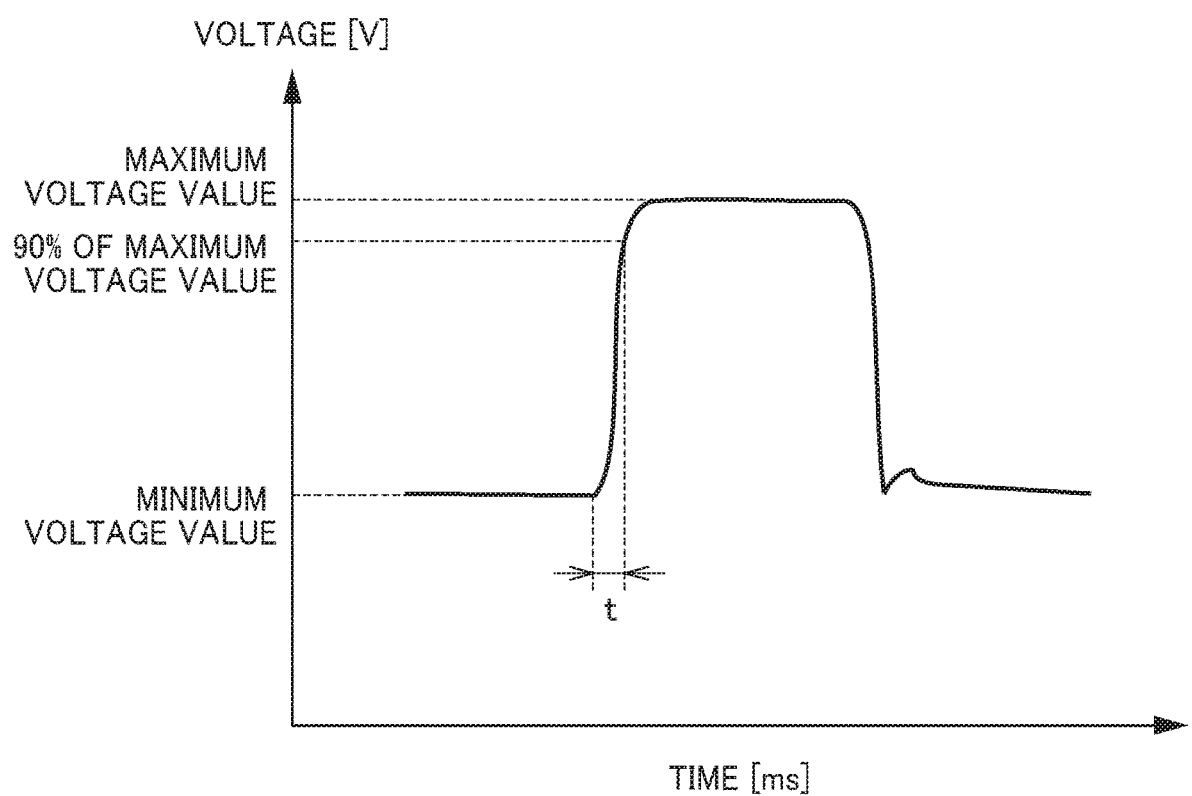

LIGHT CONTROL FILM, LIGHT CONTROL SYSTEM, AND LIGHT CONTROL MEMBER

TECHNICAL FIELD

The present invention relates to a light control film, a light control system, and a light control member.

BACKGROUND ART

In the related art, for example, various studies about a light control film that is pasted to window and controls the transmission of external light are proposed (Patent Documents 1 and 2). There is a case where liquid crystals are used as one of such light control films. In the light control film using the liquid crystals, the liquid crystals are clamped between two transparent film materials on which a transparent electrode is provided, and a voltage is applied between the transparent electrodes, and thus, the orientation of liquid crystal molecules is changed, and a transmitted amount of the external light is controlled.

Patent Document 1: Japanese Unexamined Patent Application, Publication No. H03-47392
Patent Document 2: Japanese Unexamined Patent Application, Publication No. H08-184273

DISCLOSURE OF THE INVENTION

Problems to be Solved by the Invention

As described above, the light control film is capable of controlling the amount of transmitted light of external light, but in the light control film, not only simply changing the amount of transmitted light but also a wider range of applications is required.

Means for Solving the Problems

The present invention provides the followings in order to attain the object described above.

(1) A light control film, including: a first electrode; a second electrode; and a liquid crystal layer that contains a liquid crystal material and a dichroic dye, and has a light transmittance varying in accordance with a potential difference between the first electrode and the second electrode, in which the liquid crystal layer has a first haze value in a case where the potential difference is a first potential difference, has a second haze value in a case where the potential difference is a second potential difference, and has a third haze value higher than at least the second haze value in a case where the potential difference is a third potential difference between the first potential difference and the second potential difference.

(2) In (1), the liquid crystal layer has a first transmittance in a case where the potential difference is the first potential difference, has a second transmittance in a case where the potential difference is the second potential difference, and has a third transmittance between the first transmittance and the second transmittance in a case where the potential difference is the third potential difference.

(3) A light control film, including: a first electrode; a second electrode; and a liquid crystal layer that contains a liquid crystal material and a dichroic dye, and has a light transmittance varying in accordance with a potential difference between the first electrode and the second electrode, in which the liquid crystal layer is in a light shielding state in the case of a first potential difference in which the potential difference is 0 V, is in a light transmitting state in which a transmittance is higher than that of the light shielding state in the case of a second potential difference in which the potential difference is greater than the first potential difference, and has a maximum haze value in the case of a third potential difference in which the potential difference is greater than the first potential difference, and the potential difference is less than the second potential difference.

(4) A light control film, including: a first electrode; a second electrode; and a liquid crystal layer that contains a liquid crystal material and a dichroic dye, and has a light transmittance varying in accordance with a potential difference between the first electrode and the second electrode, in which the liquid crystal layer is in a light transmitting state in the case of a first potential difference in which the potential difference is 0 V, is in a light shielding state in which a transmittance is lower than that of the light transmitting state in the case of a second potential difference in which the potential difference is greater than the first potential difference, and has a maximum haze value in the case of a third potential difference in which the potential difference is greater than the first potential difference, and the potential difference is less than the second potential difference.

(5) In any one of (1) to (3), the liquid crystal layer is in the light shielding state in the case of the first potential difference in which the potential difference is 0 V, and is in the light transmitting state in which the transmittance is higher than that of the light shielding state in the case of the second potential difference in which the potential difference is greater than the first potential difference, and in the light control film, in a case where the potential difference is changed to the second potential difference from the first potential difference, a time until a transmittance is changed to 90% of the transmittance in the light transmitting state from the transmittance in the light shielding state is longer than or equal to 16 milliseconds.

(6) In any one of (1), (2), and (4), the liquid crystal layer is in the light transmitting state in the case of the first potential difference in which the potential difference is 0 V, and is in the light shielding state in which the transmittance is lower than that of the light transmitting state in the case of the second potential difference in which the potential difference is greater than the first potential difference, and in the light control film, in a case where the potential difference is changed to the first potential difference from the second potential difference, a time until a transmittance is changed to 90% of the transmittance in the light transmitting state from the transmittance in the light shielding state is longer than or equal to 16 milliseconds.

(7) In any one of (1), (2), (3), and (5), the liquid crystal layer is in the light shielding state in the case of the first potential difference in which the potential difference is 0 V, and when a thickness of the liquid crystal layer is set to d, a chiral pitch of liquid crystal molecules contained in the liquid crystal layer is set to p, d/p is greater than or equal to 1.1 (1.1≤d/p).

(8) In any one of (1), (2), (4), and (6), the potential difference is in the light transmitting state in the case of the first potential difference in which the potential difference is 0 V, and when a thickness of the liquid crystal layer is set to d, and a chiral pitch of liquid crystal molecules contained in the liquid crystal layer is set to p, d/p is greater than or equal to 0.9 and less than or equal to 1.5 (0.9≤d/p≤1.5).

(9) In any one of (1) to (8), the liquid crystal material has dielectric anisotropy, and when a permittivity of the liquid crystal molecules of the liquid crystal material in a major axis direction is set to $\varepsilon_\|$, a permittivity of the liquid crystal molecules in a minor axis direction is set to $\varepsilon_\perp$, and an absolute value of a difference between the permittivities is set to $|\Delta\varepsilon|=|\varepsilon_\parallel-\varepsilon_\perp|$, $|\Delta\varepsilon|$ is less than or equal to 100.

(10) A light control system, including: the light control film according to any one of (1) to (9); and a control unit that changes the potential difference between the first potential difference and the second potential difference.

(11) In (10), the control unit includes a setting unit that switches the potential difference of the light control film to any one of the first potential difference, the second potential difference, and the third potential difference.

(12) In (10), the control unit includes a setting unit that switches the potential difference of the light control film to any one of the first potential difference and the second potential difference.

(13) A light control member, including: a first laminate that includes a first base material and a first electrode; a second laminate that includes a second base material and a second electrode; and a liquid crystal layer that is clamped between the first laminate and the second laminate, in which the first base material and the second base material are formed of glass, the liquid crystal layer contains a liquid crystal material and a dichroic dye, and has a light transmittance varying in accordance with a potential difference between the first electrode and the second electrode, is in a light shielding state in the case of a first potential difference in which the potential difference is 0 V, is in a light transmitting state in which a transmittance is higher than that of the light shielding state in the case of a second potential difference in which the potential difference is greater than the first potential difference, and has a maximum haze value in the case of a third potential difference in which the potential difference is greater than the first potential difference, and the potential difference is less than the second potential difference.

(14) A light control member, including: a first laminate that includes a first base material and a first electrode; a second laminate that includes a second base material and a second electrode; and a liquid crystal layer that is clamped between the first laminate and the second laminate, in which the first base material and the second base material are formed of glass, the liquid crystal layer contains a liquid crystal material and a dichroic dye, and has a light transmittance varying in accordance with a potential difference between the first electrode and the second electrode, is in a light transmitting state in the case of a first potential difference in which the potential difference is 0 V, is in a light shielding state in which a transmittance is lower than that of the light transmitting state in the case of a second potential difference in which the potential difference is greater than the first potential difference, and has a maximum haze value in the case of a third potential difference in which the potential difference is greater than the first potential difference, and the potential difference is less than the second potential difference.

Effects of the Invention

A light control film, a light control system, and a light control member of the present invention include a haze mode of setting a transmission state of light (a light transmitting state) to a cloudy state, and can be used for a wider range of applications.

BRIEF DESCRIPTION OF THE DRAWINGS

FIG. 6 is a block diagram of the light control system 20 of the third embodiment.

FIG. 7 is a diagram illustrating a response time t in the light control film 1 having a normally black structure.

PREFERRED MODE FOR CARRYING OUT THE INVENTION

First Embodiment (Configuration of Light Control Film 1)

Figure 1:
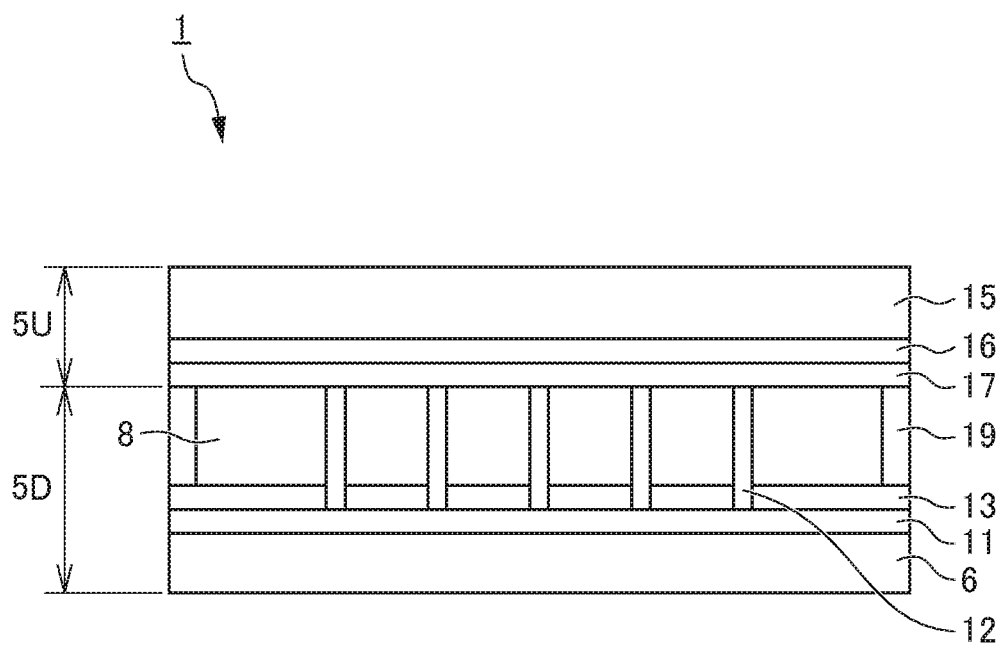
FIG. 1 is a sectional view illustrating a light control film 1 according to a first embodiment to a third embodiment.

FIG. 1 is a sectional view illustrating a light control film 1 according to a first embodiment of the present invention. The light control film 1, for example, is used by being pasted to a portion for controlling light, such as window glass, a showcase, and an indoor transparent partition of an architectural structure, and a sunroof of a vehicle, by a pressure-sensitive adhesive agent layer or the like, and controls transmitted light by changing a voltage.

The light control film 1 is a light control film 1 of a guest-host system in which a liquid crystal layer 8 is clamped between a film-like first laminate 5D and a film-like second laminate 5U, and transmitted light is controlled by changing an electric field with respect to the liquid crystal layer 8. The first laminate 5D is formed by arranging a first electrode 11, a spacer 12, and a first orientation film 13 on a first base material 6 that is a transparent film material. The second laminate 5U is formed by arranging a second electrode 16 and a second orientation film 17 on a second base material 15 that is a transparent film material. The strength of the electric field in the liquid crystal layer 8 is changed in accordance with the driving of the first electrode 11 and the second electrode 16 that are provided in the second laminate 5U and the first laminate 5D.

(Base Material)

As the first base material 6 and the second base material 15, various transparent film materials that is applicable to such a type of film material can be applied. In this embodiment, a polycarbonate film is applied as the first base material 6 and the second base material 15, and various transparent film materials such as a cycloolefin polymer (COP) film, a TAC film, a PET film, and an acrylic film can be used.

(Transparent Electrode)

As the first electrode 11 and the second electrode 16, various electrode materials that is applicable to such a type of film material can be applied, and in this embodiment, the first electrode 11 and the second electrode 16 are formed of a transparent electrode material of Indium Tin Oxide (ITO).

(Spacer)

The spacer 12 is provided in order to define the thickness of the liquid crystal layer 8, various resin materials can be widely applied as the spacer 12, and in this embodiment, the spacer 12 is prepared by a photoresist, and is prepared by applying the photoresist onto the first base material 6 on which the first electrode 11 is prepared, and by exposing and developing the photoresist. Furthermore, the spacer 12 may be provided in the second laminate 5U, or may be provided in both of the second laminate 5U and the first laminate 5D. In addition, a so-called bead spacer may be applied as the spacer 12.

(Orientation Film)

The first orientation film 13 and the second orientation film 17 are prepared by performing a rubbing treatment with respect to a polyimide resin layer. Furthermore, various configurations capable of exhibiting an orientation restricting force with respect to a liquid crystal material according to the liquid crystal layer 8 can be applied as the first orientation film 13 and the second orientation film 17, and the first orientation film 13 and the second orientation film 17 may be prepared by a so-called photo-orientation film. In this case, various materials to which a photo-orientation method is applicable can be applied as a photo-orientation material, and for example, a dimerization type material of which the orientation is not changed by being irradiated with an ultraviolet ray after being oriented once can be applied. Such a photodimerization type material is disclosed in "M. Schadt, K. Schmitt, V. Kozinkov and V. Chigrinov: Jpn. J. Appl. Phys., 31, 2155(1992)", "M. Schadt, H. Seiberle and A. Schuster: Nature, 381, 212(1996)", and the like.

(Seal Material)

In the light control film 1, a seal material 19 is arranged to surround the liquid crystal layer 8, and thus, the second laminate 5U and the first laminate 5D are integrally retained, and the leakage of the liquid crystal material is prevented, by the seal material 19.

(Liquid Crystal Layer)

The liquid crystal layer 8 contains the liquid crystal material and a dichroic dye, and is driven by a guest-host system.

(Liquid Crystal Material)

Nematic liquid crystals are used as the liquid crystal material. The liquid crystal material contains a chiral agent, and adjusts the content of the chiral agent, and thus, is capable of adjusting a chiral pitch p of liquid crystal molecules. The chiral pitch is a distance when the liquid crystal molecules are twisted by one cycle (360°) in a thickness direction of the liquid crystal layer 8.

(Chiral Agent)

The chiral agent is a low-molecular compound including an optically active portion, and induces a spiral structure in the nematic liquid crystals. For example, S-811, R811, CB-15, MLC6247, MLC6248, R1011, S1011 (all are manufactured by Merck & Co., Inc.) and the like are used as the chiral agent.

(Dichroic Dye)

The dichroic dye is a dye in which a light absorbance of the molecules in a major axis direction and a light absorbance in the minor axis direction are different from each other. In a case where an orientation state of the liquid crystal molecules is changed in accordance with a change in the voltage that is applied to the light control film 1, an orientation state of the dichroic dye is also changed in accordance with a change in the orientation state of the liquid crystal molecules. For example, LSY-116, LSR-401, LSR-405, LSB-278, LSB-350, LSB-335 (all are manufactured by Mitsubishi Chemical Corporation), and the like are used as the dichroic dye.

Figure 5A:
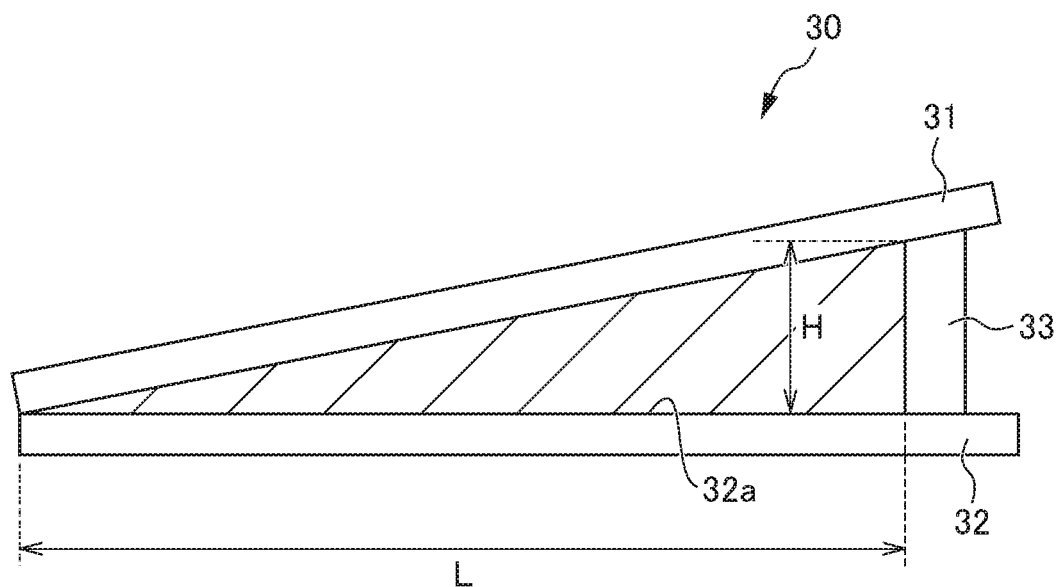
FIGS. 5A and 5B are diagrams describing a measurement method of a chiral pitch p.
Figure 5B:
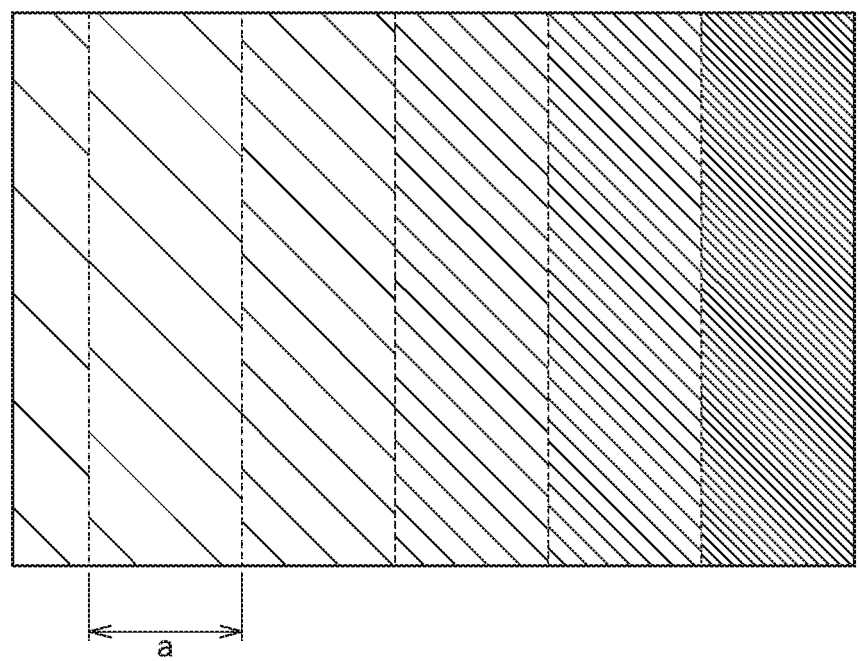

Here, a measurement method of the chiral pitch p will be described. As described above, the chiral pitch is the distance (a dimension) in the thickness direction of the liquid crystal layer 8 when the liquid crystal molecules are twisted by one cycle (360°). FIGS. 5A and 5B are diagrams describing the measurement method of the chiral pitch p. FIG. 5A is a sectional view parallel to a thickness direction of a wedge type cell 30 that is used for the measurement, and FIG. 5B illustrates a striped pattern due to a contrast difference that is observed at the time of measuring the chiral pitch p in a state where the wedge type cell 30 is seen from the plan view. The wedge type cell 30 includes two glass plates 31 and 32, and a base 33 that is arranged between the two glass plates 31 and 32, and is formed into the shape of a wedge. The sectional surface parallel to the thickness direction of the wedge type cell 30 is in the shape of a wedge, and in this embodiment, as illustrated in FIG. 5A, is in the shape of a triangle. Here, the wedge shape indicates a shape in which one end is wide, and gradually narrowed toward the other end, and includes a triangular shape or a trapezoidal shape.

A horizontal orientation film (not illustrated) is formed on a surface 32a of the glass plate 32 on the liquid crystal side that is a bottom surface of the wedge type cell 30. Therefore, in a case where the two glass plates 31 and 32 of the wedge type cell 30 is sealed with a guest-host type liquid crystal material, the liquid crystal molecules are oriented along an orientation direction of the orientation film, and are turned in accordance with the height of the cell.

In a case where the guest-host type liquid crystal material is put into the wedge type cell 30, as illustrated in FIG. 5B, a stripe due to the contrast difference appears every time when the liquid crystal molecules are turned by 180 degrees. The darkness of the stripe increases as the height H of the cell increases. In addition, the stripe appears at a regular pitch every time when the liquid crystals are turned by 180 degrees. Therefore, in a case where the width of the stripe is set to a, the dimension of the wedge type cell 30 in an array direction of the stripe is set to L, a maximum cell height of the wedge type cell 30 is set to H, and the chiral pitch is set to p, the following expression is established from a homothetic ratio.

$$2 \times a : L = p : H$$

From the above description, the chiral pitch p is represented by the following expression.

$$p = 2 \times a \times H/L$$

Furthermore, in this embodiment, the dimension of the width a of the stripe is measured three times, and an average value thereof is set to the chiral pitch p. In addition, in FIGS. 5A and 5B, an example is illustrated in which the entire space formed by the glass plates 31 and 32 and the base 33 is sealed with the liquid crystal material, but the present invention is not limited thereto, and insofar as the liquid crystal material in which two stripes necessary for measurement are observed is sealed, the chiral pitch p can be measured.

It is preferable that the chiral pitch p be greater than or equal to 0.5 μm. In a case where the liquid crystal material having a spiral structure is used in the liquid crystal layer 8, a phenomenon occurs in which light of a wavelength having a value that is obtained by multiplying an average refractive index n of the liquid crystal material and the chiral pitch p together is selectively reflected. In a case where the chiral pitch p is less than 0.5 µm, in accordance with such a phenomenon, light of a specific wavelength in a visible light range is selectively reflected, and thus, there is a possibility that it is seen that the light control film 1 is colored with a specific color, or a light transmittance of the light control film 1 decreases. Therefore, it is preferable that the chiral pitch p satisfy the range described above.

In addition, it is preferable that a thickness (a cell gap) d of the liquid crystal layer 8 be greater than or equal to 2 µm and less than or equal to 20 µm. In a case where the thickness d of the liquid crystal layer 8 is less than 2 µm, it is not preferable since it is difficult to manufacture the light control film 1 including such a liquid crystal layer 8, and a yield ratio at the time of producing the light control film 1 greatly decreases. In addition, in a case where the thickness d of the liquid crystal layer 8 is greater than 20 µm, it is not preferable since a used amount of the liquid crystal material increases, and a material cost of the light control film 1 increases. Therefore, it is preferable that the thickness d of the liquid crystal layer 8 be within the range described above. Furthermore, in a case where foreign substances are mixed into the liquid crystal layer 8, and the thickness d of the liquid crystal layer 8 is small, the thickness d of the liquid crystal layer 8 is smaller than the dimension of the foreign substances, and the liquid crystal layer 8 only in a portion into which the foreign substances are mixed is swelled, and thus, there are many cases where the appearance of the light control film 1 is degraded. However, in a case where the thickness d of the liquid crystal layer 8 is sufficiently large, and the thickness d of the liquid crystal layer 8 is larger than the dimension of the foreign substances, such degradation of the appearance can be reduced.

In addition, the liquid crystal material that is used in the liquid crystal layer 8 has refractive index anisotropy, and in a case where a refractive index of the liquid crystal material with respect to an ordinary ray is set to $n_o$, and a refractive index with respect to an extraordinary ray is set to $n_e$, refractive index anisotropy $\Delta n$ of the liquid crystal material is represented by the following expression.

$$\Delta n = n_e - n_o$$

A haze value in a haze state of the light control film 1 increases as the value of the refractive index anisotropy $\Delta n$ of the liquid crystal material increases. In this embodiment, it is preferable that the refractive index anisotropy $\Delta n$ of the liquid crystal material be greater than or equal to 0.05 since a sufficient haze value in the haze state (a haze mode) is obtained, in the light control film 1.

The refractive index anisotropy $\Delta n$ of the liquid crystal material, for example, can be calculated by the following method. First, the liquid crystal material in a state of not containing a dichroic dye is prepared, and the light control film 1 for measurement that contains the liquid crystal material in the liquid crystal layer 8 is prepared, and is set in a state where the liquid crystal molecules are fallen (in the case of a normally black structure, a state where a voltage is not applied, and in the case of a normally white structure, a state where a voltage is applied). Then, a phase difference Re and the thickness d of the liquid crystal layer 8 in such a state are measured. Here, as an example, an alternate-current voltage of 60 Hz (a sine wave) is applied to the light control film 1 for measurement by an alternate-current power source device (eK-FGJ, manufactured by Matsusada Precision Inc.). In addition, the phase difference Re can be measured by a phase difference film measurement machine (RETS-1200 VA, manufactured by Otsuka Electronics Co., Ltd.) or the like. In a case where the refractive index anisotropy of the liquid crystal material is set to $\Delta n$, and the thickness (the cell gap) of the liquid crystal layer 8 is set to d, the phase difference film Re is represented by the following expression.

$$Re = \Delta n \times d$$

Therefore, the refractive index anisotropy $\Delta n$ of the liquid crystal material can be calculated by the following expression.

$$\Delta n = Re/d$$

The light control film 1 of this embodiment has a normally black structure. The normally black structure is a structure in which a transmittance is minimized when a voltage is not applied to the liquid crystals, and a black screen is displayed. That is, in this embodiment, the liquid crystals are positive (p) type liquid crystals, and in a case where the liquid crystal molecules are horizontally oriented in a state where a voltage is not applied to the light control film 1, the dichroic dye is also horizontally oriented, and a visible ray transmittance of the light control film 1 decreases. In contrast, in a case where the liquid crystal molecules are vertically oriented in a state where a voltage is applied to the light control film 1, the dichroic dye is also vertically oriented, and the visible ray transmittance of the light control film 1 increases.

Figure 2:
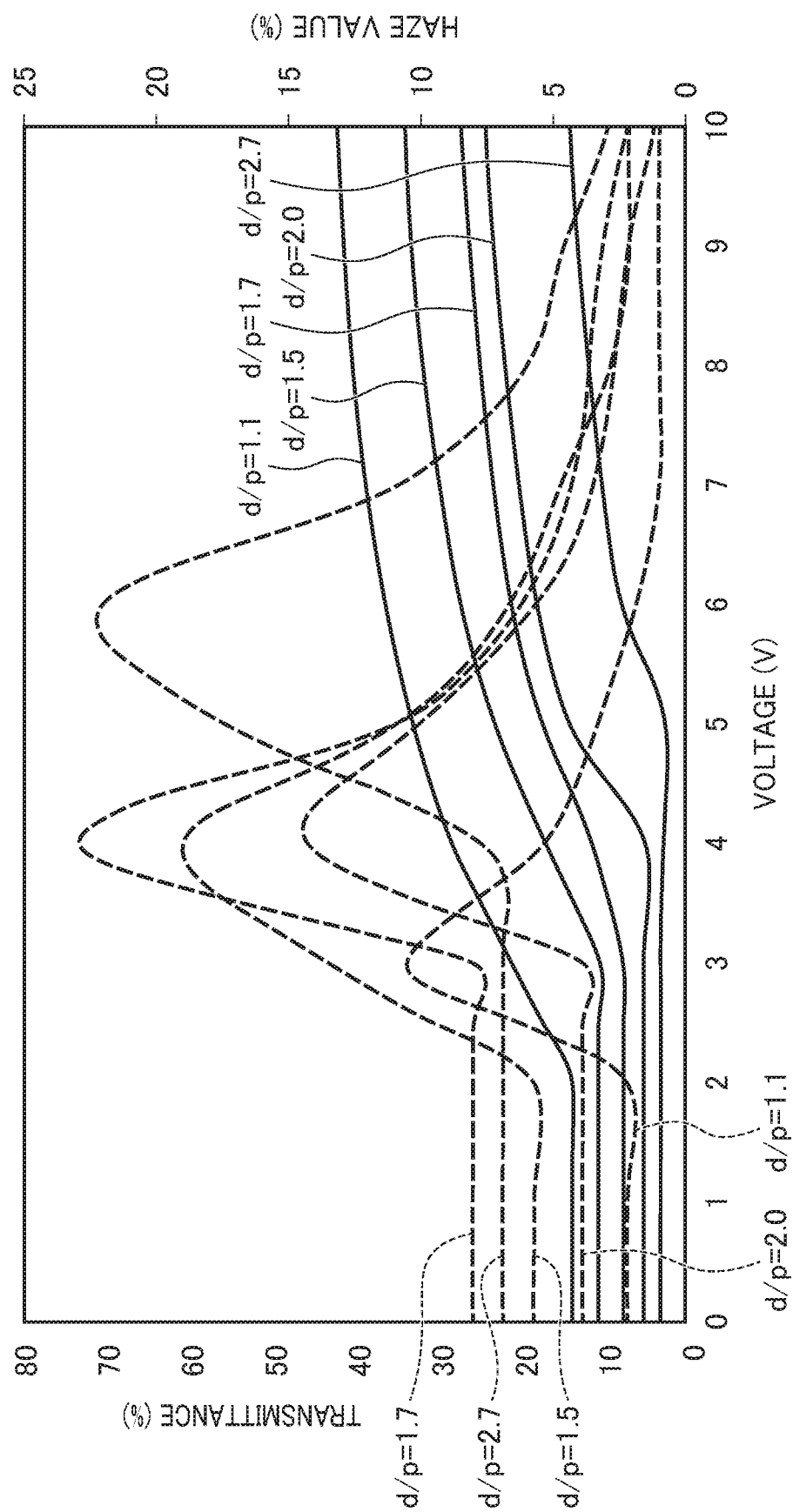
FIG. 2 is a test result of a transmittance and a haze value in a case where a voltage to be applied to electrodes of a plurality of light control films 1 having different d/p is changed, in the light control film 1 of the first embodiment.

In such a light control film 1, a test result of the transmittance and the haze value in the case of changing a voltage to be applied to electrodes of a plurality of light control films 1 having different ratios (d/p) of the thickness (the cell gap) d of the liquid crystal layer to the chiral pitch p of the liquid crystal molecules (a potential difference between both electrodes) is illustrated in FIG. 2. The haze value is a ratio of a diffusive transmittance (a diffusive light ray transmittance) to a total light ray transmittance. That is, a turbidity (a cloudiness) indicates an index relevant to the transparency of the light control film 1. In a case where the haze value is large, the light control film 1 is in a cloudy state (the haze state).

As with this embodiment, in the light control film 1 of the normally black structure, both of the liquid crystal molecules and the dichroic dye are fallen and turned such that a longitudinal direction becomes a surface direction of the light control film 1 (a direction orthogonal to the thickness direction) in a state where a voltage is not applied to the light control film 1 (the liquid crystal layer 8), and thus, a dark state (a light shielding state) having a low transmittance is obtained. In addition, in both of the liquid crystal molecules and the dichroic dye, the major axis direction becomes a direction parallel to the thickness direction of the liquid crystal layer 8 in a state where a predetermined voltage is applied to the light control film 1 (the liquid crystal layer 8), and thus, a bright state (a light transmitting state) having a high transmittance is obtained. In a case where a voltage between the voltage in the dark state and the voltage in the bright state is applied to the light control film 1 (the liquid crystal layer 8), in the liquid crystal molecules and the dichroic dye, a state is obtained in which the major axis direction is inclined in various directions with respect to the thickness direction of the liquid crystal layer 8, and light is diffused, and thus, the light control film 1 is in the cloudy state (the haze state).

In FIG. 2, the scale of a left vertical axis indicates the transmittance, the scale of a right vertical axis indicates the haze value, and a horizontal axis indicates the applied voltage. As illustrated, the voltage is changed, and thus, an electric field in the liquid crystal layer 8 is changed, and the orientation of the liquid crystal molecules is changed between the horizontal orientation and the vertical orientation. An orientation direction of the dichroic dye is also changed in tandem with a change in the orientation of the liquid crystal molecules, and thus, the incident light transmittance is controlled. At this time, the haze value is also changed in accordance with a variation in the voltage. Furthermore, in FIG. 2, a solid line indicates the transmittance, and a broken line indicates the haze value. Furthermore, in the test result illustrated in FIG. 2, a maximum value of the voltage to be applied to the electrode of the light control film 1 is set to 10 V, but the present invention is not limited thereto, and the maximum value of the voltage to be applied to the electrode may be suitably selected in accordance with the size of the light control film 1, a desired design value of the transmittance, a usage environment of the light control film 1, and the like.

Here, the measurement machine or the like used for measuring the haze value, the transmittance, and the like will be described. An alternate-current voltage of 60 Hz (a rectangular wave) is applied to the light control film 1 by an alternate-current power source device (eK-FGJ, manufactured by Matsusada Precision Inc.). Furthermore, in a graph illustrated in FIG. 2 and FIG. 4 described below, a voltage indicated on a horizontal axis is a setting value in an alternate-current power source device when a voltage is applied to the light control film 1. The haze value and the transmittance of the light control film 1 are measured by using a hazemeter (HM-150, manufactured by MURAKAMI COLOR RESEARCH LABORATORY CO., LTD.). Furthermore, a measurement method of the haze value is based on JIS K 7136, and a measurement method of the transmittance is based on JIS K 7361.

The thickness (the cell gap) d of the liquid crystal layer 8 of the light control film 1 corresponds to the height of the spacer 12 of the liquid crystal layer 8 (the dimension of the spacer 12 in the thickness direction of the liquid crystal layer 8), and can be measured by various measurement machines. As with this embodiment, in a case where the spacer 12 is a spherical bead spacer, the height (the thickness d of the liquid crystal layer 8) can be measured by a microscope such as a scanning type electron microscope (SEM). In addition, in a case where the spacer 12 is in the shape of a column, the height can be measured by a light interference type shape measurement machine. The measurement method of the chiral pitch p is as described above. A sample of the light control film 1 that is used for measuring the haze value or the transmittance by applying a voltage is in the shape of a square having a size of 70 mm long and 70 mm wide in the plan view. In addition, in the sample of the light control film 1 that is used for measurement, a guest-host type liquid crystal material is used as the liquid crystal material of the liquid crystal layer 8, and the sample has a normally black structure.

(1) Case where d/p is 1.1 (Twist of 384 Degrees)

Transmittance: The transmittance increases in accordance with an increase in the voltage. Haze Value: The haze value increases once at a voltage of approximately 3 V, and has a peak value of approximately up to 10%. After that, in a case where the voltage increases, and the transmittance also starts to increase, the haze value decreases. Furthermore, the twist is a rotation (twist) angle of the liquid crystal molecules between the first orientation film 13 and the second orientation film 17.

(2) Case where d/p is 1.5 (Twist of 528 Degrees)

Transmittance: The transmittance increases in accordance with an increase in the voltage. However, an increase amount is smaller than (1). Haze Value: The haze value increases once at a voltage of approximately 3.9 V, and has a peak value of approximately up to 18%. After that, in a case where the voltage increases, and the transmittance also starts to increase, the haze value decreases.

(3) Case where d/p is 1.7 (Twist of 624 Degrees)

Transmittance: The transmittance increases in accordance with an increase in the voltage. However, an increase amount is smaller than (2). Haze Value: The haze value increases once at a voltage of approximately 4.0 V, and has a peak value of approximately up to 23%. After that, in a case where the voltage increases, and the transmittance also starts to increase, the haze value decreases.

(4) Case where d/p is 2.0 (Twist of 720 Degrees)

Transmittance: The transmittance increases in accordance with an increase in the voltage. However, an increase amount is smaller than (3). Haze Value: The haze value increases once at a voltage of approximately 4.1 V, and has a peak value of approximately up to 15%. After that, in a case where the voltage increases, and the transmittance also starts to increase, the haze value decreases.

(5) Case where d/p is 2.7 (Twist of 960 Degrees)

Transmittance: The transmittance increases in accordance with an increase in the voltage. However, an increase amount is smaller than (4). Haze Value: The haze value increases once at a voltage of approximately 5.8 V, and has a peak value of approximately up to 22%. After that, in a case where the voltage increases, and the transmittance also starts to increase, the haze value decreases.

As described above, it is known that in a case where d/p of the light control film 1 is any one of d/p=1.1, d/p=1.5, d/p=1.7, d/p=2.0, and d/p=2.7, in a region where the voltage to be applied to the electrode is an intermediate value (an intermediate voltage between a voltage at which the transmittance is maximized and a voltage at which the transmittance is minimized), the haze value has a peak value, that is, there is a range in which the haze value increases. That is, in a case where d/p is at least 1.1 d/p, the light control film 1 has a range in which the voltage is the intermediate value, and the haze increases.

Figure 3:
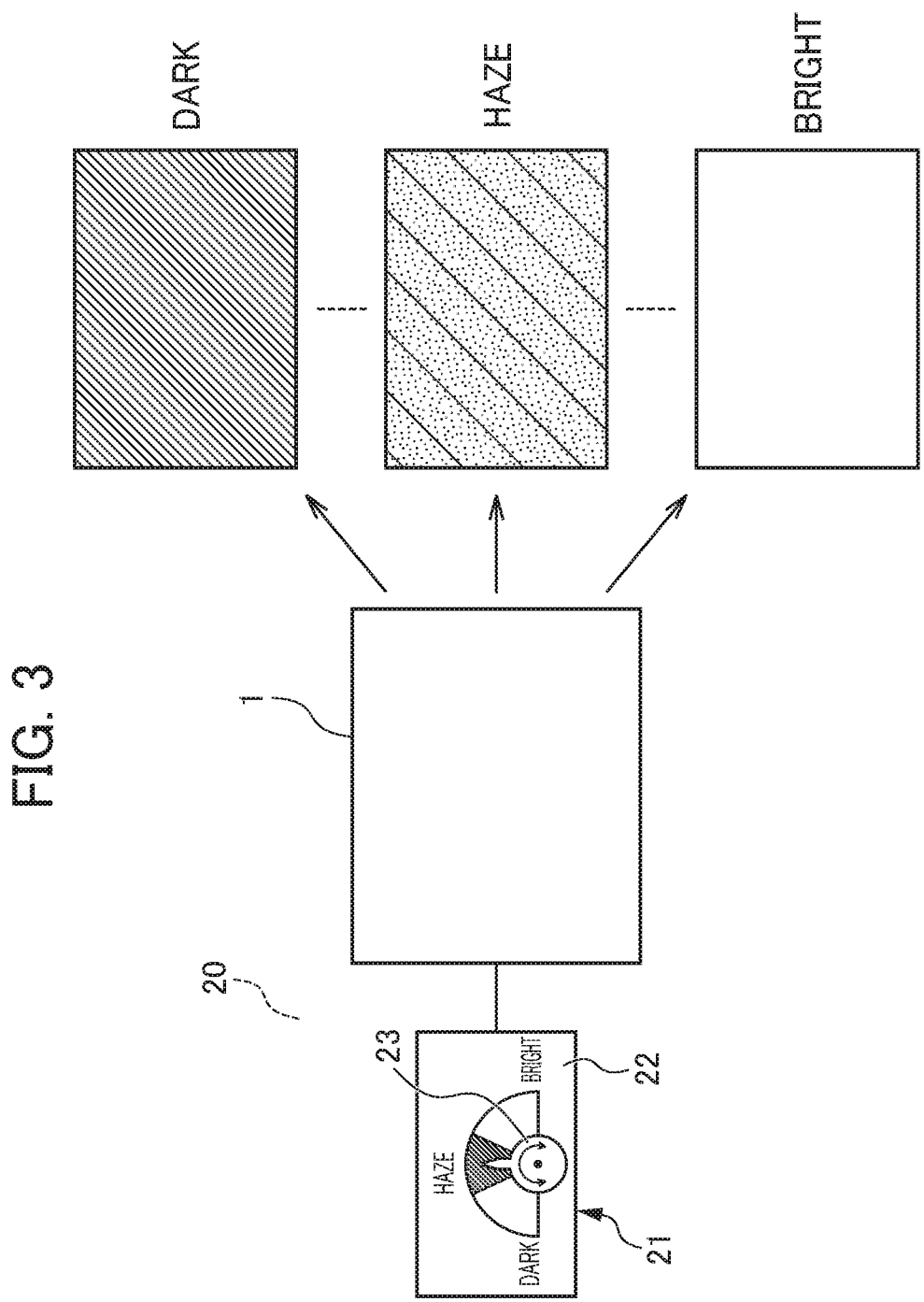
FIG. 3 is a block diagram of a light control system 20 provided with the light control film 1 according to the first embodiment and the second embodiment.

FIG. 3 is a block diagram of the light control system 20 including the light control film 1 of this embodiment. The light control system 20 includes the light control film 1 and a control unit 21. In the light control film 1, d/p is 1.1 d/p. Therefore, the light control film 1 has a range in which the haze value increases, in a region where the voltage to be applied to the electrode is the intermediate value between the voltage at which the transmittance is maximized (in this embodiment, for example, 10 V) and the voltage at which the transmittance is minimized (0 V). The control unit 21 includes a main body portion 22, and an adjustment knob 23 that can be rotated with respect to the main body portion 22. In a case where the adjustment knob 23 is rotated with respect to the main body portion 22, the voltage to be applied to the electrode of the light control film 1 is changed. In a case where the adjustment knob 23 is rotated on one end side of a rotatable region (in the drawing, a side written with "dark" on a left side), the voltage to be applied to the electrode is minimized (0 V), and the transmittance of the light control film 1 is also minimized (a dark state). In a case where the adjustment knob 23 is rotated on the other end side of the rotatable region (in the drawing, a side written with "bright" on a right side), the voltage is maximized (in this embodiment, for example, 10 V) and the transmittance is maximized (a bright state). Furthermore, in this embodiment, in the light control system 20, the maximum value of the voltage to be applied to the electrode of the light control film 1 is set to 10 V, but the present invention is not limited thereto, and the maximum value of the voltage to be applied to the electrode may be suitably selected in accordance with the size of the light control film 1, a desired design value of the transmittance, a usage environment of the light control film 1, and the like.

The light control film 1 of this embodiment has a region in which the light control film 1 is in the haze state, in a region where the voltage to be applied to the electrode is in the middle between the minimum voltage and the maximum voltage. In a case where the voltage to be applied to the electrode is changed by rotating the adjustment knob 23, and the haze state (in the drawing, a position written with "haze" on the center between positions written with "dark" and "bright") is selected, the voltage to be applied to the electrode is in a certain region (a haze region) where the haze value is maximized, as illustrated in FIG. 2. In a case where the voltage is in the haze region, the light control film 1 is in the haze state illustrated on a right side of FIG. 3. That is, a transparence decreases, and it is difficult to observe an opposite side through the light control film 1, as with opaque glass. Therefore, for example, in a case where the light control film 1 is used in glass of a house or a car, it is possible not only to adjust an incident light amount but also to make it difficult to observe the inside from the outside, to observe the outside from the inside. According to this embodiment, as described above, the light control system 20 including the light control film 1 is capable of setting the light control film 1 to be in a state where the transmittance is low, in a state where the transmittance is high, and in a state of opaque glass, and thus, a user is capable of suitably selecting the state of the light control film 1.

Furthermore, as with this embodiment, in a case where the light control film 1 has a normally black structure, the peak value of the haze value in the haze state is preferably greater than or equal to 5%, is more preferably greater than or equal to 8%, and is even more preferably greater than or equal to 10%. The haze value satisfies such a range, and thus, it is possible to ensure a sufficient decrease in the transparence of the light control film 1 in the haze state (the cloudy state), and it is possible for an observer to obviously visually confirm that the light control film 1 is in the state of the opaque glass.

Second Embodiment

Next, a second embodiment of the present invention will be described. The second embodiment is different from the first embodiment in that the light control film 1 of this embodiment has a normally white structure. The normally white structure is a structure in which a transmittance is maximized when a voltage is not applied to the liquid crystals, and a transparent state is obtained. The light control system 20 of the second embodiment is identical to that of the first embodiment. That is, in this embodiment, the liquid crystals are negative (n) type liquid crystals, and in a case where the liquid crystal molecules are vertically oriented in a state where a voltage is not applied to the light control film 1, the dichroic dye is also vertically oriented, and the transmittance of the light control film 1 increases. In contrast, in a case where the liquid crystal molecules are horizontally oriented in a state where a voltage is applied to the light control film 1, the dichroic dye is also horizontally oriented, and the transmittance of the light control film 1 decreases.

Figure 4:
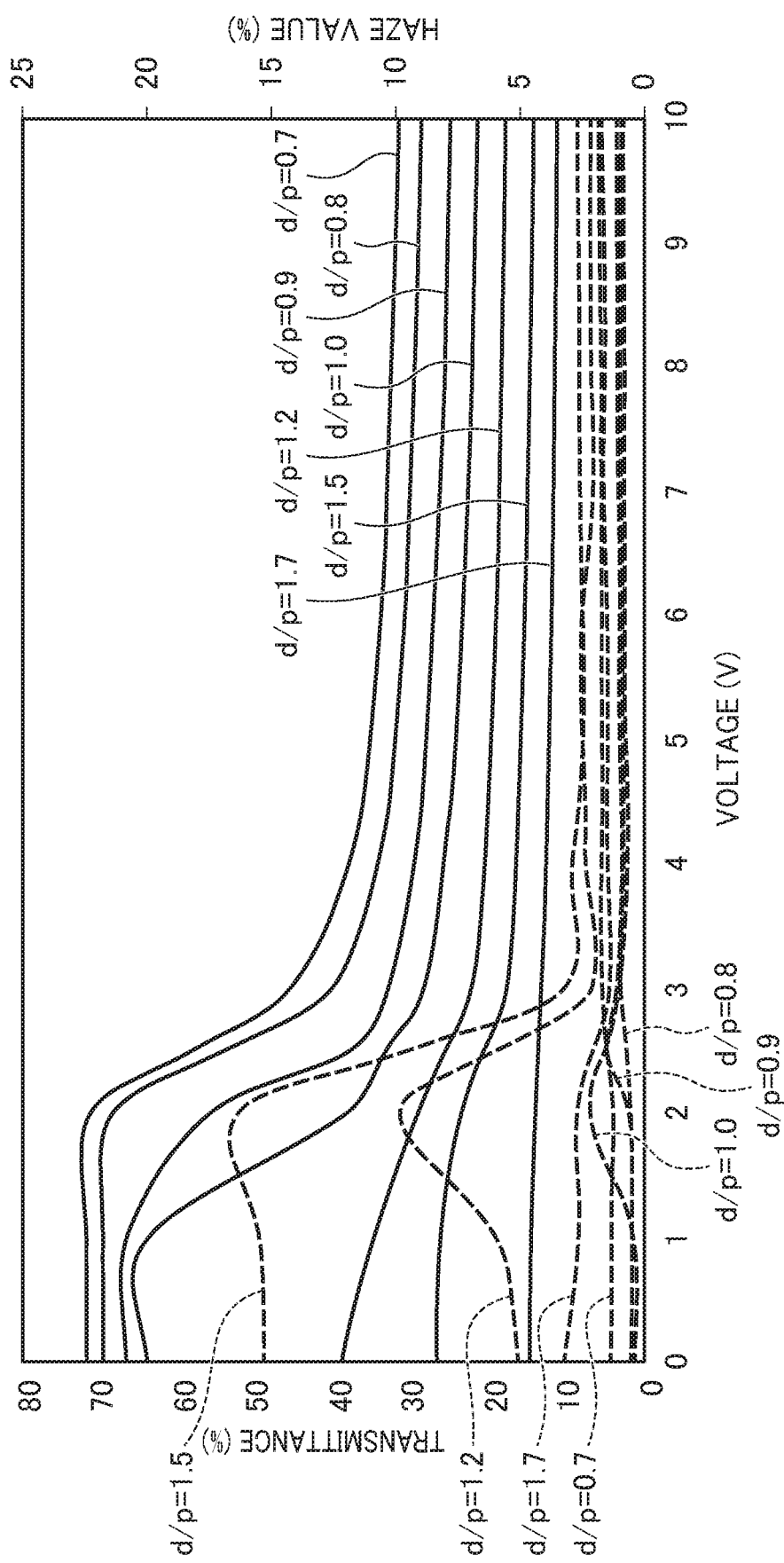
FIG. 4 is a test result of a transmittance and a haze value in a case where a voltage to be applied to the electrodes of the plurality of light control film 1 having different d/p is changed, in the light control film 1 of the second embodiment.

In the light control film 1 of the second embodiment, a test result of the transmittance and the haze value in the case of changing the voltage to be applied to the electrodes of the plurality of light control films 1 having different ratios (d/p) of the thickness d of the liquid crystal layer to the chiral pitch p of the liquid crystal molecules is illustrated in FIG. 4. The measurement method of the haze value and the transmittance of the light control film 1 of this embodiment is identical to that described in the test result of FIG. 2, in the first embodiment described above. In addition, a sample of the light control film 1 of this embodiment that is used for measuring the haze value or the transmittance is in the shape of a square having a size of 70 mm long and 70 mm wide in the plan view, a guest-host type liquid crystal material is used as the liquid crystal material of the liquid crystal layer 8 in the sample, and the sample has a normally white structure.

As with FIG. 2 of the first embodiment, the scale of a left vertical axis indicates the transmittance, the scale of a right vertical axis indicates the haze value, and a horizontal axis indicates the applied voltage. Furthermore, in FIG. 4, a solid line indicates the transmittance, and a broken line indicates the haze value. Furthermore, in the test result illustrated in FIG. 4, the maximum value of the voltage to be applied to the electrode of the light control film 1 is set to 10 V, but the present invention is not limited thereto, and the maximum value of the voltage to be applied to the electrode may be suitably selected in accordance with the size of the light control film 1, a desired design value of the transmittance, a usage environment of the light control film 1, and the like.

(1) Case where d/p is 0.7 (Twist of 240 Degrees)

Transmittance: The transmittance is approximately constantly 71% to 74% until voltage is approximately 1.8 V from 0 V, the transmittance greatly decreases to approximately 45% in a case where the voltage is approximately 3.0 V from 1.8 V, and after that, the transmittance continuously slightly decreases in accordance with an increase in the voltage. Haze Value: The haze value is approximately constantly 1% at a voltage of 0 V to 10 V.

(2) Case where d/p is 0.8 (Twist of 280 Degrees)

Transmittance: The transmittance is approximately constantly 70% until the voltage is approximately 1.8 V from 0 V, the transmittance greatly decreases to approximately 40% in a case where the voltage is approximately 3.0 V from 0.8 V, and after that, the transmittance continuously slightly decreases in accordance with an increase in the voltage. Haze Value: The haze value is approximately constantly 1% at a voltage of 0 V to 10 V.

(3) Case where d/p is 0.9 (Twist of 320 Degrees)

Transmittance: The transmittance is approximately constantly 67% until the voltage is approximately 0.9 V from 0 V, the transmittance greatly decreases to approximately 35% in a case where the voltage is 2.5 V from 0.9 V, and after that, the transmittance continuously slightly decreases in accordance with an increase in the voltage. Haze Value: The haze value has a peak value of approximately 1.5% at a voltage of approximately 2.5 V at which the transmittance decreases. The haze value is approximately 1.0% at the other voltages.

(4) Case where d/p is 1.0 (Twist of 360 Degrees)

Transmittance: The transmittance gradually increases and is approximately up to 65% until the voltage is approximately 0.8 V from 0 V, and after that, the transmittance greatly decreases to approximately 30% in a case where the voltage is approximately 3 V, and after that, the transmittance continuously slightly decreases in accordance with an increase in the voltage. Haze Value: The haze value has a peak value of approximately 2.0% at a voltage of approximately 2.0 V. After that, the haze value decreases to approximately 1.0% in a case where the voltage increases to approximately 2.5 V, and the haze value is maintained at 1.0% at a voltage greater than the voltage.

(5) Case where d/p is 1.2 (Twist of 440 Degrees)

Transmittance: The transmittance gradually decreases until the voltage is approximately 3.0 V from 0 V, and after that, the transmittance continuously slightly decreases in accordance with an increase in the voltage. Haze Value: The haze value has a peak value of approximately 10.0% at a voltage of approximately 2.0 V at which the transmittance decreases. After that, the haze value decreases to approximately 2.5% in a case where the voltage increases to approximately 3 V, and the haze value is maintained at 2.5% at a voltage greater than the voltage.

(6) Case where d/p is 1.5 (Twist of 520 Degrees)

Transmittance: The transmittance gradually decreases until the voltage is approximately 3.0 V from 0 V, and after that, the transmittance continuously slightly decreases in accordance with an increase in the voltage. Haze Value: The haze value has a peak value of approximately 17.0% at a voltage of approximately 2.0 V. After that, the haze value decreases to approximately 2.5% in a case where the voltage increases to approximately 3.0 V, and the haze value is maintained at approximately 2.5% at a voltage greater than the voltage.

(7) Case where d/p is 1.7 (Twist of 600 Degrees)

Transmittance: The transmittance is approximately constant at a voltage of 0 V to 10 V. Haze Value: There is no peak value of the haze value, and the haze value continuously slightly decreases to 1.0% from 2.5% in accordance with an increase in the voltage.

In this embodiment, it is known that in a case where d/p of the light control film 1 is 0.9≤d/p≤1.5, in the region where the voltage to be applied to the electrode is the intermediate value between the voltage at which the transmittance is maximized and the voltage at which the transmittance is minimized, the haze value has the peak value, that is, there is the range in which the haze value increases. In the light control film 1 of this embodiment, 0.9≤d/p≤1.5 is satisfied, and a voltage of approximately 1.5 V to 2.5 V is set to the haze region. Accordingly, in a case where the haze region is selected in the adjustment knob, the voltage to be applied to the electrode is 1.5 V to 2.5 V, and the light control film 1 can be set in the haze state. That is, as with the first embodiment, the transparence decreases, and it is difficult to observe the opposite side through the light control film 1, as with the opaque glass. That is, the light control system 20 including the light control film 1 of this embodiment includes the state in which the transmittance is low, the state in which the transmittance is high, and the state of the opaque glass. Therefore, for example, it is possible to not only to adjust the incident light amount but also to make it difficult to observe the inside from the outside, to observe the outside from the inside by using the light control film 1 in glass of a house or a car.

Furthermore, as with this embodiment, in a case where the light control film 1 has a normally white structure, the peak value of the haze value in the haze state is preferably greater than or equal to 1.5%, is more preferably greater than or equal to 5%, and is even more preferably greater than or equal to 10%. The haze value satisfies such a range, and thus, it is possible to ensure a sufficient decrease in the transparence of the light control film 1 in the haze state (the cloudy state), and it is possible for the observer to obviously visually confirm that the light control film 1 is in the state of the opaque glass.

Third Embodiment

FIG. 6 is a block diagram of the light control system 20 of a third embodiment. The third embodiment is different from the first embodiment and the second embodiment in that the light control system 20 can be switched to only two states of the state in which the transmittance is low (the light shielding state and the dark state) and the state in which the transmittance is high (the light transmitting state and the bright state). The light control system 20 of the third embodiment includes the light control film 1 and the control unit 21. The control unit 21 includes the main body portion 22 and the adjustment knob 23, and rotates the adjustment knob 23 with respect to the main body portion 22, and thus, it is possible to switch the voltage to be applied to the electrode of the light control film 1. Furthermore, in FIG. 6, an example is illustrated in which the light control system 20 of the third embodiment includes the adjustment knob 23, but the present invention is not limited thereto, and the voltage to be applied to the electrode may be switched by a switch, a button, or the like. In the light control system 20 of the third embodiment, the light control film 1 of the normally black structure described in the first embodiment may be used, or the light control film 1 of the normally white structure described in the second embodiment may be used. Here, as an example, an example of using the light control film 1 of the normally black structure described in the first embodiment will be described.

First, the light control system 20 of this embodiment will be described. In the light control system 20 of this embodiment, in a case where the position of the adjustment knob 23 is on one end side of the rotatable region (in the drawing, a "dark" side on a left side), the voltage to be applied to the electrode is minimized (0 V), and the transmittance of the light control film 1 is also minimized (the dark state). In addition, in a case where the position of the adjustment knob 23 is on the other end side of the rotatable region (in the drawing, a "bright" side on a left side), the voltage to be applied to the electrode is maximized, and the transmittance of the light control film 1 is also maximized (the bright state). In this embodiment, as an example, an example will be described in which the light control film 1 described in the first embodiment is used as the light control film 1 provided in the light control system 20, and 10 V can be set as the maximum value of the voltage to be applied to the electrode, and the maximum value of the voltage to be applied to the electrode may be suitably selected in accordance with the size of the light control film 1, a desired design value of the transmittance, a usage environment of the light control film 1, and the like, may be a value greater than or less than 10 V.

In this embodiment, as described above, the adjustment knob 23 is capable of selecting one of "dark" and "bright" as the transmittance of the light control film 1. That is, in this embodiment, as with the first embodiment and the second embodiment, the voltage to be applied to the light control film 1 is not maintained at the intermediate value between the minimum value and the maximum value, and can be switched to any one of the minimum value and the maximum value by the adjustment knob 23. In the light control system 20 of this embodiment, for example, in a case where the voltage to be applied to the light control film 1 is switched to the maximum value from the minimum value, the light control film 1 represents a change in the transmittance and the haze value over time in a case where the horizontal axis in FIG. 2 of the first embodiment described above is assumed as an elapsed time, and the light control film 1 is in the bright state through the haze state from the dark state.

In this embodiment, in a case where the voltage to be applied to the light control film 1 is switched to the maximum value from the minimum value (that is, in a case where the adjustment knob 23 is switched to "bright" from "dark"), a response time that is a time until the transmittance of the light control film 1 reaches a value corresponding to 90% of the maximum value from the minimum value (a time until the transmittance reaches a transmittance corresponding to 90% of the transmittance to the in the light transmitting state from the transmittance in the light shielding state) is preferably longer than or equal to 16 milliseconds, is more preferably longer than or equal to 100 milliseconds, and is even more preferably longer than or equal to 200 milliseconds. In this embodiment, the response time of the light control film 1 in the light control system 20 is set within the range described above, and thus, the light control film 1 is in the bright state through the haze state from the dark state at the time of switching the voltage to be applied to the light control film 1 to the maximum value from the minimum value, and the haze state is sufficiently visually confirmed by the observer. Accordingly, when the light control film 1 is switched between "dark" and "bright", the observer visually confirms the outside scene such that the outside scene through the light control film 1 is not instantaneously changed, but is changed through a cloudy state (the haze state), and thus, it is possible to soften the impression of a change in the outside scene through the light control film 1 at the time of switching.

Furthermore, the response time that is the time until the transmittance of the light control film 1 reaches the value corresponding to 90% of the maximum value from the minimum value (the time until the transmittance reaches the transmittance corresponding to 90% of the transmittance in the light transmitting state from the transmittance in the light shielding state) can be measured by the following method. First, the light control film 1 is placed on a sample base of a microscope (BX51-XP, a polarization microscope manufactured by Olympus Corporation). Furthermore, an optical microscope not having a polarization function can also be used as the microscope. Next, a minimum voltage value and a maximum voltage value are repeatedly applied to the light control film 1 placed on the sample base at each 10 seconds by a function generator (EAVE FACTORY WF1974 manufactured by NF Corporation). The minimum voltage value is 0 V, and the maximum voltage value can be suitably selected in accordance with the size of the light control film 1, and the like. Here, the light control film 1 has a normally black structure, and as an example, the maximum voltage value is set to 20 V (60 Hz, a rectangular wave).

Transmitted light in a case where the voltage to be applied to the light control film 1 is the minimum voltage value and in a case where the voltage to be applied to the light control film 1 is the maximum voltage value is converted into a voltage signal by an optical sensor (C8137-02 manufactured by Hamamatsu Photonics K.K.), and read by an oscilloscope (TDS 1012B manufactured by TEKTRONIX, INC). FIG. 7 is a diagram illustrating a response time t in the light control film 1 of the normally black structure. In FIG. 7, a screen of the oscilloscope is illustrated, and a vertical axis indicates a voltage (V), and a horizontal axis indicates a time (milliseconds: ms). The light control film 1 has a normally black structure, and thus, when the voltage to be applied to the electrode is the minimum voltage value (here, 0 V), the light control film 1 is in the dark state (the light shielding state), and when the voltage to be applied to the electrode is the maximum voltage value (here, 20 V), the light control film 1 is in the bright state (the light transmitting state). A time until reaching 90% of a maximum value of the signal (90% of the maximum voltage value) from initial rise of the signal at the time of changing to the bright state from the dark state (at the time of changing to the maximum voltage value from the minimum voltage value) due to the switching of the voltage value signal is read, and thus, the response time t can be obtained.

In addition, the liquid crystal material that is used in the liquid crystal layer 8 of the light control film 1 has the dielectric anisotropy (permittivity anisotropy), and when the permittivity of the liquid crystal molecules in the major axis direction is set to $\varepsilon_\parallel$, and the permittivity of the liquid crystal molecules in the minor axis direction is set to $\varepsilon_\perp$, dielectric anisotropy $\Delta\varepsilon$ of the liquid crystal material is represented by the following expression.

$$\Delta\varepsilon = \varepsilon_\parallel - \varepsilon_\perp$$

In this embodiment, an absolute value $|\Delta\varepsilon| = |\varepsilon_\parallel - \varepsilon_\perp|$ of the dielectric anisotropy of the liquid crystal material is preferably less than or equal to 100, is more preferably less than or equal to 60, and is even more preferably less than or equal to 30. In a case where the value of the absolute value $|\Delta\varepsilon|$ of the dielectric anisotropy is large, a response speed of the liquid crystal molecules in the case of applying a voltage to the light control film 1 becomes fast, and in a case where the value of the absolute value $|\Delta\varepsilon|$ of the dielectric anisotropy is small, the response speed of the liquid crystal molecules in the case of applying a voltage to the light control film 1 becomes slow.

Therefore, in this embodiment, the absolute value $|\Delta\varepsilon|$ of the dielectric anisotropy satisfies the range described above, and thus, when the light control film 1 is switched to the bright state from the dark state, it is possible for the observer to sufficiently visually confirm the haze state. Accordingly, when the light control film 1 is switched, the outside scene is not instantaneously changed, but is changed through the cloudy state (the haze state), and thus, it is possible to soften the impression of a change in the outside scene through the light control film 1 at the time of switching. Furthermore, in the liquid crystal layer 8, in a case where by a plurality of types of liquid crystal materials are used by being mixed, in each of the liquid crystal molecules, it is preferable that liquid crystal molecules of which the absolute value $|\Delta\varepsilon|$ of the dielectric anisotropy is minimized satisfy the range described above, and it is preferable that liquid crystal molecules of which the absolute value $|\Delta\varepsilon|$ of the dielectric anisotropy is maximized satisfy the range described above from the viewpoint of further increasing the effect of softening the impression of a change in the outside scene at the time of switching.

Figure 8:
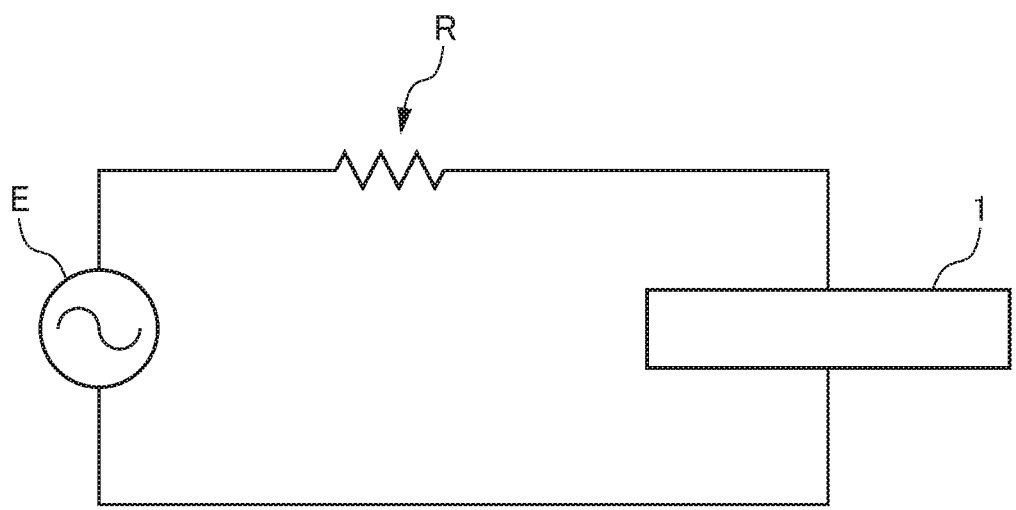
FIG. 8 is a diagram illustrating a measurement method of dielectric anisotropy $\Delta\varepsilon$ of a liquid crystal material.

The absolute value $|\Delta\varepsilon|$ of the dielectric anisotropy of the liquid crystal material, for example, can be obtained by the following method. FIG. 8 is a diagram illustrating a measurement method of the dielectric anisotropy $\Delta\varepsilon$ of the liquid crystal material. As illustrated in FIG. 8, an alternate-current power source device E (eK-FGJ manufactured by Matsusada Precision Inc.), the light control film 1, and a resistance R are connected to each other in series. Furthermore, in the alternate-current power source device E, a frequency f is 60 Hz (a sine wave), and a resistance value $R_1$ of the resistance R is 10 kΩ. A permittivity in a state where the liquid crystal molecules are erected in the thickness direction of the liquid crystal layer 8 (that is, the major axis direction of the liquid crystal molecules) and a permittivity in a state where the liquid crystal molecules are fallen (that is, the minor axis direction of the liquid crystal molecules) are measured by switching on/off of a power source of the alternate-current power source device E (on/off of the voltage to be applied to the light control film 1), and thus, a difference Δε can be obtained.

When dielectric capacity of the liquid crystal layer 8 (the light control film 1) is set to C, the area of the liquid crystal layer 8 is set to S, the thickness of the liquid crystal layer 8 is set to d, a vacuum permittivity is set to co, the permittivity (a specific permittivity) $\varepsilon_r$ of the liquid crystal material is represented by the following expression.

$$C = \varepsilon_r \times \varepsilon_0 \times S/d$$

Therefore, $\varepsilon_r$ is represented by the following expression.

$$\varepsilon_r = C \times d/(S \times \varepsilon_0)$$

$\varepsilon_0 = 8.85 \times 10^{-12}$ is established, and the thickness d of the liquid crystal layer 8 and the area S of the liquid crystal layer 8 can be respectively measured and calculated. Therefore, the dielectric capacity C at each of on/off of the power source of the alternate-current power source device E is measured, and thus, a permittivity $\varepsilon_r$ in the state where the liquid crystal molecules are erected in the thickness direction of the liquid crystal layer 8, that is, the permittivity $\varepsilon_\parallel$ in the major axis direction of the liquid crystal, and the permittivity $\varepsilon_r$ in the state where the liquid crystal molecules are fallen, that is, the permittivity $\varepsilon_\perp$ in the minor axis direction of the liquid crystal molecules can be respectively calculated from the expression described above.

In a circuit illustrated in FIG. 8, in a case where a voltage to be applied to the resistance is set to $V_R$, and a voltage of the alternate-current power source device is set to $V_E$, a voltage $V_c$ according to the light control film 1 is represented by the following expression.

$$V_c = \sqrt{(V_E^2 - V_R^2)}$$

Here, the voltage $V_R$ to be applied to the resistance, and the voltage $V_E$ of the alternate-current power source device can be measured by a tester (not illustrated) (CDM-2000D manufactured by CUSTOM corporation). In a case where the current through the liquid crystal layer 8 (the light control film 1) is set to $I_c$, and the frequency of the alternate-current power source device is set to f, the voltage $V_c$ according to the light control film 1 is represented by the following expression.

$$V_c = I_c \times 1/(2\pi \times f \times C)$$

Therefore, the electrostatic capacity C of the liquid crystal layer 8 is can be obtained by the following expression. Here, f=60 Hz, $I_c = V_R/R_1$, and $R_1 = 10$ kΩ are established.

$$C = I_c \times 1/(2\pi \times f \times V_c)$$

The permittivity $\varepsilon_\parallel$ in the major axis direction of the liquid crystal molecules and the permittivity $\varepsilon_\perp$ in the minor axis direction of the liquid crystal molecules are respectively obtained from the electrostatic capacity C of the liquid crystal layer 8 at each of on/off of the power source of the alternate-current power source device E that is obtained by the expression described above, and the expression of $\varepsilon_r = C \times d/(S \times \varepsilon_0)$ described above, and the difference Δε is obtained, and thus, the absolute value |Δε| of the dielectric anisotropy of the liquid crystal material is obtained.

In addition, in this embodiment, it is preferable that the refractive index anisotropy Δn of the liquid crystal molecules be greater than or equal to 0.05 since a sufficient haze value in the haze state (the haze mode) is obtained in the light control film 1.

In addition, as with this embodiment, in a case where the light control film 1 has a normally black structure, the peak value of the haze value in the haze state is preferably greater than or equal to 5%, is more preferably greater than or equal to 8%, is even more preferably greater than or equal to 10%. By satisfying such a range, the haze state between the dark state and the bright state is easily visually confirmed by the observer, and thus, it is possible to soften the impression at the time of switching the dark state and the bright state, and to decrease stimulus that is received by a drastic change in brightness between the dark state and the bright state.

In the light control system 20 of this embodiment, in a case where of using the light control film 1 of the normally white structure as illustrated in second embodiment, the response time that is the time until the transmittance of the light control film 1 reaches the value corresponding to 90% of the maximum value from the minimum value (the time until the transmittance reaches the transmittance corresponding to 90% of the transmittance in the light transmitting state from the transmittance in the light shielding state) in a case where the voltage to be applied to the light control film 1 is switched to the minimum value from the maximum value (that is, in a case where the adjustment knob 23 is switched to "bright" from "dark") is preferably longer than or equal to 16 milliseconds, is more preferably longer than or equal to 100 milliseconds, and is even more preferably longer than or equal to 200 milliseconds.

Even in a case where the light control film 1 has a normally white structure, the response time that is the time until reaching the transmittance corresponding to 90% of the transmittance in the light transmitting state from the transmittance in the light shielding state can be obtained by the same device as that in the case of the normally black structure described above. However, the light control film 1 has a normally white structure, and the maximum voltage value to be applied to the electrode of the light control film 1 by a function generator is set to 10 V (60 Hz, a rectangular wave), as an example. The maximum voltage value can be suitably selected in accordance with the size of the light control film 1, and the like. In addition, the light control film 1 has a normally white structure, and thus, when the voltage to be applied to the electrode is the minimum voltage value (here, 0 V), the light control film 1 is in the bright state (the light transmitting state), and when the voltage to be applied to the electrode is the maximum voltage value (here, 10 V), the light control film 1 is in the dark state (the light shielding state). Then, the time until reaching 90% of the maximum value of the intensity of the signal from the initial rise of the signal at the time of changing to the bright state from the dark state due to the switching of the voltage value is read, and thus, it is possible to obtain the response time that is the time until the transmittance of the light control film 1 reaches the transmittance corresponding to 90% of the transmittance in the light transmitting state from the transmittance in the light shielding state.

In addition, in a case where the light control film 1 has a normally white structure, the peak value of the haze value in the haze state is preferably greater than or equal to 1.5%, is more preferably greater than or equal to 5%, and is even more preferably greater than or equal to 10%. By satisfying such a range, the haze state between the dark state and the bright state is easily visually confirmed by the observer, and thus, it is possible to soften the impression at the time of switching the dark state and the bright state, and to decrease stimulus that is received by a drastic change in brightness between the dark state and the bright state.

Furthermore, the reason that a preferred peak value of the haze value in a case where the light control film 1 has a normally white structure is less than that in a case where the light control film 1 has a normally black structure is because in a case where the light control film 1 is in the dark state through the haze state from the bright state, the transmittance in the haze state also increases, and thus, the haze state is more easily visually confirmed.

(Modification)

The present invention is not limited to each of the embodiments described above, various modifications or changes can be performed, and the modifications or changes are also within the scope of the present invention.

(1) In each of the embodiments, an example has been described in which the base materials 6 and 15 are a film-like member formed of a resin, but the present invention is not limited thereto, and for example, sheet-like or plate-like member of glass may be used as the base materials 6 and 15, and the light control film 1 may be a light control member that is not in the shape of a film.

Furthermore, each of the embodiments and the modification can be used by being suitably combined, and the detailed description will be omitted. In addition, the present invention is not limited to each of the embodiments described above, and the like.

EXPLANATION OF REFERENCE NUMERALS

1 LIGHT CONTROL FILM
5D FIRST LAMINATE
5U SECOND LAMINATE
6 FIRST BASE MATERIAL
8 LIQUID CRYSTAL LAYER
11 TRANSPARENT ELECTRODE
12 SPACER
13 FIRST ORIENTATION FILM
15 SECOND BASE MATERIAL
16 SECOND ELECTRODE
17 SECOND ORIENTATION FILM
19 SEAL MATERIAL
20 LIGHT CONTROL SYSTEM
21 CONTROL UNIT
22 MAIN BODY PORTION
23 ADJUSTMENT KNOB

The invention claimed is:

1. A light control film, comprising:
a first electrode;
a second electrode; and
a liquid crystal layer that contains a liquid crystal material and a dichroic dye, and has a light transmittance varying in accordance with a potential difference between the first electrode and the second electrode,
wherein the liquid crystal layer,
has a first haze value in a case where the potential difference is a first potential difference being 0 V,
has a second haze value in a case where the potential difference is a second potential difference being 10 V, and
has a third haze value higher than at least the second haze value in a case where the potential difference is a third potential difference between the first potential difference and the second potential difference.

2. A light control film, comprising:
a first electrode;
a second electrode; and
a liquid crystal layer that contains a liquid crystal material and a dichroic dye, and has a light transmittance varying in accordance with a potential difference between the first electrode and the second electrode,
wherein the liquid crystal layer,
is in a light shielding state in a case of a first potential difference in which the potential difference is 0 V,
is in a light transmitting state in which a transmittance is higher than that of the light shielding state in a case of a second potential difference in which the potential difference is greater than the first potential difference,
has a first haze value in a case of the first potential difference,
has a second haze value in a case of the second potential difference,
has a maximum haze value in a case of a third potential difference in which the potential difference is greater than the first potential difference, and the potential difference is less than the second potential difference, and
the maximum haze value is greater than the first haze value and the second haze value.

3. The light control film according to claim 2, wherein, in the light control film, in a case where the potential difference is changed to the second potential difference from the first potential difference, a time until a transmittance is changed to 90% of the transmittance in the light transmitting state from the transmittance in the light shielding state is longer than or equal to 16 milliseconds.

4. The light control film according to claim 2, wherein, when a thickness of the liquid crystal layer is set to d, a chiral pitch of liquid crystal molecules contained in the liquid crystal layer is set to p, d/p is greater than or equal to 1.1 ($1.1 \leq d/p$).

5. The light control film according to claim 4, wherein d/p is greater than or equal to 1.1 and less than or equal to 2.7 ($1.1 \leq d/p \leq 2.7$).

6. The light control film according to claim 2, wherein the liquid crystal material has dielectric anisotropy, and when a permittivity of the liquid crystal molecules of the liquid crystal material in a major axis direction is set to $\varepsilon_{//}$, a permittivity of the liquid crystal molecules in a minor axis direction is set to $\varepsilon_\perp$, and an absolute value of a difference between the permittivities is set to $|\Delta\varepsilon|=|\varepsilon_{//}-\varepsilon_\perp|$, $|\Delta\varepsilon|$ is less than or equal to 100.

7. A light control system, comprising:
the light control film according to claim 2; and
a control unit that changes the potential difference between the first potential difference and the second potential difference.

8. A light control film, comprising:
a first electrode;
a second electrode; and
a liquid crystal layer that contains a liquid crystal material and a dichroic dye, and has a light transmittance varying in accordance with a potential difference between the first electrode and the second electrode,
wherein the liquid crystal layer,
is in a light transmitting state in a case of a first potential difference in which the potential difference is 0 V,
is in a light shielding state in which a transmittance is lower than that of the light transmitting state in a case of a second potential difference that is 10 V,
has a first haze value in a case of the first potential difference,
has a second haze value in a case of the second potential difference,
has a maximum haze value in a case of a third potential difference in which the potential difference is greater than the first potential difference, and the potential difference is less than the second potential difference, and the maximum haze value is greater than the first haze value and the second haze value.

9. The light control film according to claim 8, wherein, in the light control film, in a case where the potential difference is changed to the first potential difference from the second potential difference, a time until a transmittance is changed to 90% of the transmittance in the light transmitting state from the transmittance in the light shielding state is longer than or equal to 16 milliseconds.

10. The light control film according to claim 8, wherein, when a thickness of the liquid crystal layer is set to d, and a chiral pitch of liquid crystal molecules contained in the liquid crystal layer is set to p, d/p is greater than or equal to 0.9 and less than or equal to 1.5 (0.9≤d/p≤1.5).

11. The light control film according to claim 8, wherein the liquid crystal material has dielectric anisotropy, and when a permittivity of the liquid crystal molecules of the liquid crystal material in a major axis direction is set to ε//, a permittivity of the liquid crystal molecules in a minor axis direction is set to ε⊥, and an absolute value of a difference between the permittivities is set to |Δε|=|ε//−ε⊥|, |Δε| is less than or equal to 100.

12. A light control system, comprising:

the light control film according to claim 8; and a control unit that changes the potential difference between the first potential difference and the second potential difference.

13. A light control member, comprising:

a first laminate that includes a first base material and a first electrode;

a second laminate that includes a second base material and a second electrode; and a liquid crystal layer that is clamped between the first laminate and the second laminate, wherein the first base material and the second base material are formed of glass, the liquid crystal layer contains a liquid crystal material and a dichroic dye, and has a light transmittance varying in accordance with a potential difference between the first electrode and the second electrode, the liquid crystal layer, is in a light shielding state in a case of a first potential difference in which the potential difference is 0 V, is in a light transmitting state in which a transmittance is higher than that of the light shielding state in a case of a second potential difference in which the potential difference is greater than the first potential difference, has a first haze value in a case of the first potential difference, has a second haze value in a case of the second potential difference, has a maximum haze value in a case of a third potential difference in which the potential difference is greater than the first potential difference, and the potential difference is less than the second potential difference, and the maximum haze value is greater than the first haze value and the second haze value.

14. A light control member, comprising:

a first laminate that includes a first base material and a first electrode;

a second laminate that includes a second base material and a second electrode; and a liquid crystal layer that is clamped between the first laminate and the second laminate, wherein the first base material and the second base material are formed of glass, the liquid crystal layer contains a liquid crystal material and a dichroic dye, and has a light transmittance varying in accordance with a potential difference between the first electrode and the second electrode, the liquid crystal layer, is in a light transmitting state in a case of a first potential difference in which the potential difference is 0 V, is in a light shielding state in which a transmittance is lower than that of the light transmitting state in a case of a second potential difference that is 10 V, has a first haze value in a case of the first potential difference, has a second haze value in a case of the second potential difference, has a maximum haze value in a case of a third potential difference in which the potential difference is greater than the first potential difference, and the potential difference is less than the second potential difference, and the maximum haze value is greater than the first haze value and the second haze value.

* * * * *